United States Patent Office 3,396,360
Patented Aug. 6, 1968

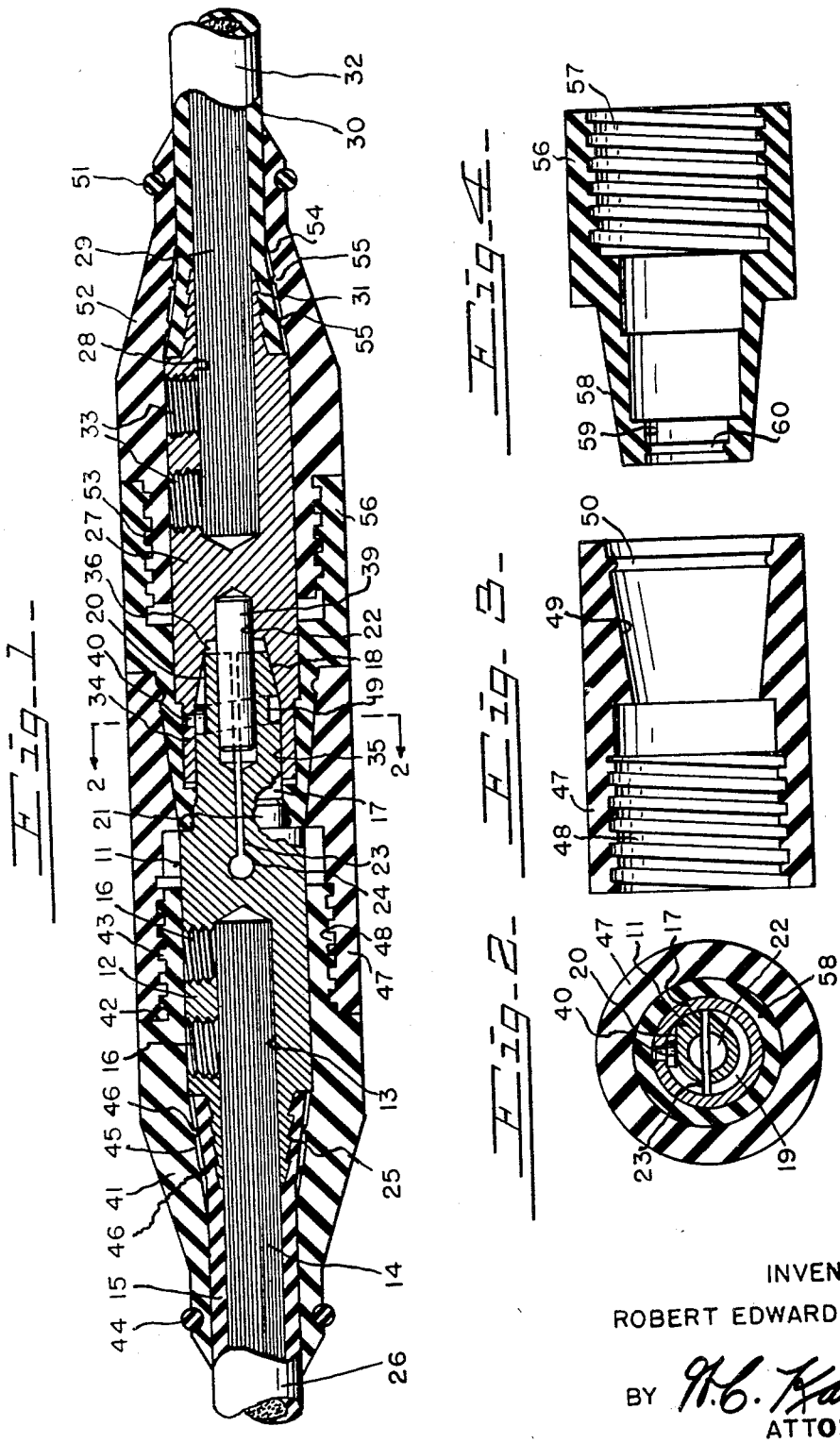

3,396,360
COUPLING FOR CABLES OR THE LIKE
Robert Edward Piaget, 4432 Homer Ave.,
Cincinnati, Ohio 45227
Filed Aug. 26, 1966, Ser. No. 575,310
8 Claims. (Cl. 339—94)

ABSTRACT OF THE DISCLOSURE

A cable coupling having insulating sleeves respectively about a male connector and a female connector which include interlocking means for themselves when joined together, an extension on the sleeve mounted about the female connector and in which an internal annular protuberance is forced for engaging the male connector as the connectors are joined, thereby providing for a positive fluid tight seal. A shoulder is provided on the male connector, and onto which such protuberance rides. The sleeves may include tapering peripheral configurations for readily mating same together.

Summary

This invention relates to improved means for coupling sections of heavy cables of the type used for electric arc welding. Cables supplying current for welding operation on large scale structures require repeated lengthening or shortening and the couplings made between cables must be fluid tight to prevent electrical leakage or becoming a hazard to the operator. The connection must be made with a minimum of time for the operation.

My improved cable coupling device permits ready assembly thereof, whereby the coupling will be fluid tight and will not pull apart under great strain and primarily concerns the sealing of the joining insulating material to positively seal the joints against fluid or electrical leakage.

The object of my invention is to provide a cable connector coupling which is simple to attach and which will make a positive fluid tight coupling incapable of being pulled apart.

A further object is to provide means for locking the insulation on the cable to the coupling to prevent exposure of the electrical conductors.

A still further object is to provide a tapered connection between the respective sleeves, with an internal annular protuberance on one of the sleeves to seal the connection between the sleeves.

A still further object is to provide the male connector with a shoulder, and the sleeve engaging said shoulder with an internal annular protuberance to tightly seal the sleeve to the shoulder.

My invention will be further readily understood from the following description and claims, and from the drawings, in which latter:

FIG. 1 is a longitudinal section of my improved coupling.

FIG. 2 is a cross-section of the same, taken in the plane of the line 2—2 of FIG. 1.

FIG. 3 is a longitudinal section of one of the sleeves, and

FIG. 4 is a longitudinal section of the mating sleeve to the one shown in FIG. 3.

My improved coupling comprises a male connector 11 having a shank 12 with an end bore 13 to receive a stripped end 14 of a cable 15. The stripped end 14 of the cable is held in the bore 13 by means of headless set screws 16, or it may be soldered or brazed into the bore. The connector has a reduced shank 17 provided with a tapered end 18 and a concentric helical groove 19. A flat 20 is cut across the face of the shank 17. The shank is provided with a shoulder 21, the purpose of which will be hereinafter described. A bore 22 is in this end of the shank and a saw cut 23 extends to a cross hole 24. The other end of the connector is provided with tapered saw-toothed grooves 25 to engage the inner face of an insulating cover 26 of the cable 15.

A female connector 27 has a bore 28 for reception of a stripped end 29 of a cable 30. The end of the connector 27 is provided with tapered saw-toothed grooves 31 over which the inner face of an insulating covering 32 of the cable 30 is pushed on. The stripped end 29 is attached in the bore 28 by means of headless set screws 33 or may be brazed or soldered in place. The other end of the female connector 27 has a reduced extension 34 and a bore 35 with a tapered inner portion 36. A pin 39 is secured within the bore 35 and forms a guide for the male connector. A second pin or button 40 is secured in the bore 35 to make a positive connection with the helical groove 19 in the male connector 11. Thus, connectors 11, 27 are provided with interlocking means for themselves.

An insulating sleeve 41 provided with a shoulder 42 and threaded end 43 is slipped on the cable 15 after an O-ring 44 is slipped on the cable and before the cable is attached to the male connector 11. This sleeve is provided with a tapered bore 45 having a pair of spaced annular ribs 46 moulded therein. The sleeve is pushed forward after the cable has been connected to the connector 11 and the annular ribs 46 will form a tight fit over the expanded cable covering. The O-ring 44 is then attached to the end of the sleeve to form a tight water-proof connection with the cable. A second insulating sleeve 47 has internal threads 48 to mate with the threads 43 and a tapered bore 49 (FIG. 3) provided with an internal annular protuberance 50 near the end of the tapered bore 49.

An O-ring 51 and a sleeve 52 having external threads 53 are slipped over the cable 30 prior to attaching the stripped portion 29 to the connector 27. The sleeve is then drawn forward with a tapered face 54 thereon having annular ribs 55 engaging the expanded portion of the cable covering 32 to form a water tight connection aided by the O-ring 51 clamping the end of the sleeve 52. A second sleeve 56 is provided with internal threads 57 and a tapered forward portion 58. The sleeve 56 is drawn over the female connector 27 with a reduced bore 59 extending beyond the connector 27 and having an internal annular protuberance 60.

To assemble the two connectors, the male connector 11 is pushed into the female connector 27 with the button 40 riding the flat 20 to the helical groove 19. The pin 39 aids in guiding the parts together and as the male connector is turned, the tapered end 18 is wedged between the pin 39 and the tapered bore 36. The tapered end 58 of the sleeve 56 jams the protuberance 50 and the protuberance 60 rides up on the shoulder 21 to form an electrical and fluid tight connection, preventing dust and dirt to enter the connection.

The extending portion of the sleeve 56 over the female connector 27 contains arcing to the interior of the device as the parts are disassembled, as the male connector 11 will be free of the female connector 27 before it is out of the extension if the power is on and also if the connector comes in contact with conductive material.

Having thus fully described my invention, what I claim as new and desire to secure by Letters Patent is:

1. A coupling for a cable or the like comprising in combination,
   a male connector and a female connector,
   said connectors having interlocking means for themselves,
   insulating sleeves about said connectors and each having a connection mating with each other, an extension on the mating connection of the insulating sleeve about the female connector for containing arcing to the interior of the coupling device when said connectors are separated, and an internal annular protuberance in said extension engaging the male connector for forming a positive fluid seal when said connectors are joined together.

2. The coupling of claim 1 in which the mating connection of each of the insulating sleeves is tapered.

3. The coupling of claim 1 including a shoulder on the male connector and onto which said extension is forced to cause said protuberance to seal said connection.

4. The coupling of claim 8 in which the mating connection of each of the insulating sleeves is tapered.

5. In a coupling for a cable or the like having a male connector and a female connector, said connectors having interlocking means for themselves, a first insulating sleeve about said male connector and having a bore, a second insulating sleeve about said female connector and having a forward portion extending beyond the female connector, the improvement comprising an extension on said portion, and an annular protuberance in said extension engaging said male connector, whereby a positive fluid seal is formed when said connectors are joined together.

6. The coupling of claim 1 in which the bore of the first insulating sleeve and the forward portion of the second insulating sleeve are each tapered whereby they mate together upon introducing said forward portion into said bore.

7. The improvement of claim 2 including a shoulder on said male connector and onto which said protuberance rides upon joining together said connectors.

8. The coupling of claim 7 in which the bore of the first insulating sleeve and the forward portion of the second insulating sleeve are each tapered whereby they mate together upon introducing said forward portion into said bore.

References Cited

UNITED STATES PATENTS

| | | | |
|---|---|---|---|
| 2,466,997 | 4/1949 | Morris | 339—207 X |
| 2,648,030 | 8/1953 | Kiekhaefer | 339—26 X |
| 2,722,667 | 11/1955 | Huston | 339—94 X |
| 2,742,622 | 4/1956 | Stevens | 339—60 |
| 2,935,720 | 5/1960 | Lorimer | 339—94 |
| 3,143,384 | 8/1964 | Senior | 339—94 |

RICHARD E. MOORE, *Primary Examiner.*

UNITED STATES PATENT OFFICE
CERTIFICATE OF CORRECTION

Patent No. 3,396,360                                              August 6, 1968

Robert Edward Piaget

It is certified that error appears in the above identified patent and that said Letters Patent are hereby corrected as shown below:

Column 3, line 13, the claim reference numeral "8" should read -- 3 --. Column 4, line 1, the claim reference numeral "1" should read -- 5 --; line 6, the claim reference numeral "2" should read -- 5 --.

Signed and sealed this 23rd day of December 1969.

(SEAL)
Attest:

Edward M. Fletcher, Jr.                            WILLIAM E. SCHUYLER, JR.
Attesting Officer                                        Commissioner of Patents